(12) United States Patent
Giacomin

(10) Patent No.: US 8,689,593 B2
(45) Date of Patent: Apr. 8, 2014

(54) ANTI-THEFT SECURITY DEVICE FOR VEHICLES

(75) Inventor: Fabrice Giacomin, Creteil Cedex (FR)

(73) Assignee: Valeo Securite Habitacle, Creteil (FR)

( * ) Notice: Subject to any disclaimer, the term of this patent is extended or adjusted under 35 U.S.C. 154(b) by 778 days.

(21) Appl. No.: 12/518,839

(22) PCT Filed: Dec. 13, 2007

(86) PCT No.: PCT/EP2007/063920
§ 371 (c)(1),
(2), (4) Date: Jun. 11, 2009

(87) PCT Pub. No.: WO2008/074726
PCT Pub. Date: Jun. 26, 2008

(65) Prior Publication Data
US 2010/0011819 A1    Jan. 21, 2010

(30) Foreign Application Priority Data
Dec. 19, 2006 (FR) ...................................... 06 11105

(51) Int. Cl.
*B60R 25/02* (2013.01)
(52) U.S. Cl.
USPC ................................. 70/187; 70/186; 70/252
(58) Field of Classification Search
USPC ............................................ 70/186, 187, 252
See application file for complete search history.

(56) References Cited

U.S. PATENT DOCUMENTS

| 6,237,378 B1 * | 5/2001 | Canard ............................ 70/252 |
| 6,327,882 B1 * | 12/2001 | Canard ............................ 70/186 |
| 6,354,117 B1 * | 3/2002 | Canard ............................ 70/186 |
| 6,508,088 B1 * | 1/2003 | Barbier et al. .................. 70/186 |

FOREIGN PATENT DOCUMENTS

| EP | 0 631 912 A1 | 1/1995 |
| EP | 631912 A1 * | 1/1995 | ............. B60R 25/02 |
| EP | 1 084 915 A1 | 3/2001 |
| FR | 2 788 477 A1 | 1/1999 |

OTHER PUBLICATIONS

International Search Report w/translation from PCT/EP2007/063920 dated Apr. 14, 2008 (4 pages).

* cited by examiner

*Primary Examiner* — Suzanne Dino Barrett
*Assistant Examiner* — Ifeolu Adeboyejo
(74) *Attorney, Agent, or Firm* — Osha Liang LLP

(57) ABSTRACT

The invention relates to an anti-theft device for the steering column of a motor vehicle, comprising a locking device including: a sensor (4) located close to the input of the rotor (2) such that it can be biased by the key (3) once it has been introduced into the rotor (2), and a retractable retaining member which can move between a locked position in which it acts on the control finger (7) in order to prevent the longitudinal movement of the slide (6) in the direction of the cam (8) counter to elastic means and an unlocked position in which the slide is released and can move under the action of the elastic means. In addition, coupling means between the sensor (4) and the retaining member enable said retaining member to be moved into: the locked position when the rotor (2) is in the rest position and the key (3) is engaged therein, and the unlocked position when the rotor (2) is in the rest position and the key is removed therefrom.

4 Claims, 5 Drawing Sheets

REAR                                                    FRONT

REAR　　　　　　　　　　FRONT

ANTI-THEFT SECURITY DEVICE FOR VEHICLES

The present invention relates to a vehicle antitheft device using a device for locking the steering column of a vehicle when the ignition key is withdrawn.

More particularly, but not exclusively, it relates to an antitheft device for motor vehicle steering comprising a casing in which a rotor is mounted so as to rotate between an angular rest position (the position also called the stop position) in which an appropriate key may be inserted, from front to rear, or withdrawn axially, and at least one angular position of use, in which the key cannot be extracted from the rotor, the rotor comprising a rotary outlet member forming a cam which is capable of interacting with a control finger supported by a slide in order to control the movements of the latter. The slide is mounted so as to slide in the casing in an axial direction between a front antitheft position to which it is pushed elastically and in which it protrudes axially forward through an opening of the casing in order to prevent a member of the steering column from rotating when the rotor is in the rest position, with the key extracted, and a rear position retracted inside the casing.

Many enhancements have been made to the antitheft devices of this type.

There are rotors using a control pull bar for actuating a bolt mounted so as to slide axially, one end of which supports a tilting finger and the other end of which is made so as to interact with a locking finger that can move radially at the entrance of the rotor. This locking finger, which is situated at the opposite end from the tilting finger, is designed so as to be moved by the key when it is inserted into the rotor so as to pass into a position in which it interacts with the pull bar in order to lock it axially.

Patents FR 2 788 477 and EP 1 084 915 present devices making it possible to retain the slide while the key is not fully withdrawn.

However, these devices are not satisfactory because the pull bar tends to deform during surface treatments. This embodiment is costly. Producing the elements is awkward and tight manufacturing tolerances must be respected, which further increases the manufacturing cost. Installation difficulties occur because the installation of the assembly with a key matching the rotor is not possible.

The systems proposed up to now directly retain a pull bar via a finger moved radially or virtually radially by pressure of the key on this finger which, in turn, locks the pull bar. The direct action of this finger on the slide, given the clearances, frictions and small relative movements, leads to the problems specified above.

In order to remedy these disadvantages, the invention proposes an antitheft device for motor vehicle steering comprising a casing in which a rotor is mounted so as to rotate between an angular rest position in which an appropriate key may be inserted, via an orifice from front to rear, or withdrawn axially from rear to front, and at least one angular position of use, in which the key cannot be extracted from the rotor, the rotor comprising, at the opposite end from the entrance orifice, a rotary outlet member forming a cam comprising an inner face substantially situated in a plane perpendicular to the axis of rotation of the rotor, said cam being capable of interacting with a control finger supported by a slide mounted so as to slide in the casing, in an axial direction, between a rear antitheft position to which it is pushed by elastic means and in which it protrudes axially rearward through an opening of the casing in order to control the rotational locking of a member of the steering column when the rotor is in the rest position, with the key extracted, and a front position retracted inside the casing.

According to the invention, this antitheft device also comprises a locking device comprising:
  a sensor situated in the vicinity of the entrance of the rotor so as to be able to be operated by the key when it is inserted into said rotor,
  a retractable retention member that can move between a locked position in which it acts on the control finger in order to prevent the longitudinal movement of the slide in the direction of the cam against the elastic means and an unlocked position in which the slide is "freed" and can move under the effect of said elastic means,
  connecting means between said sensor and said retention member making it possible to move the retention member to the locked position when the rotor is in the rest position and the key is engaged therein and in the unlocked position when the rotor is in the rest position and the key is withdrawn from the rotor.

Advantageously:
  the locking device may comprise a lever tilting about an axis YY' that is fixed relative to the rotor and perpendicular to the axis of the rotor, this lever comprising:
  a) at one end, a protruding lever finger which forms the abovementioned retention means,
  b) at the other end, a u-shaped member interacting with the key in the vicinity of the orifice for insertion of the key into the rotor,
  the lever finger may comprise an oblique face which is oriented at an angle of between 100 and 145 degrees relative to the longitudinal axis LL' of the tilting lever, so that the lever finger can escape under the action of the tilting finger subjected to the pressure of the abovementioned elastic means, the key being withdrawn from the rotor.
  the cam may comprise a cavity provided for completely housing the end of the lever comprising the lever finger so that the lever finger can be fully retracted into the cavity leaving the tilting finger free to move longitudinally toward the rear of the rotor when the rotor is in the stop position and the key is withdrawn.
  the face of the lever finger interacting with the tilting finger is substantially in the plane of the inner face of the cam so that the tilting finger can without difficulty pass from a bearing on the inner face of the cam to a bearing on the face of the lever finger interacting with the tilting finger, when the rotor and the key are turned and the rotor reaches the stop position.
  the lever finger can be an independent part guided radially in a groove provided for this purpose in the cam, and operated radially by the end of the lever when the latter turns about its axis of articulation YY'.

One embodiment of the invention will be described below as a nonlimiting example and making reference to the appended drawings in which.

Figure 1:
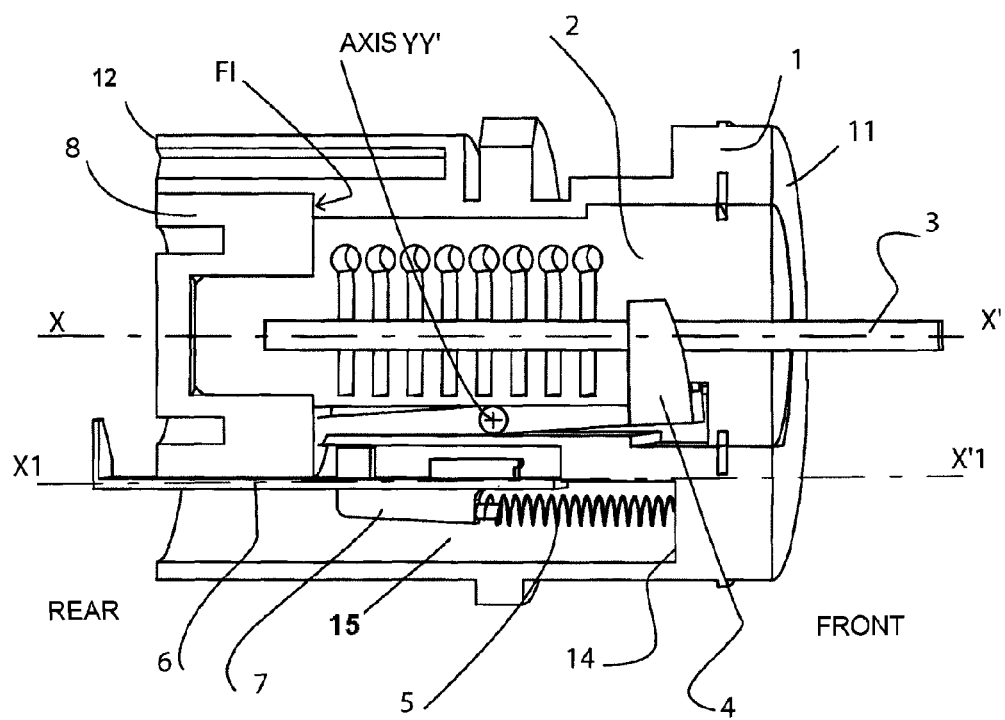
FIG. 1 shows schematically a section of a rotor according to the invention, the key being inserted into the rotor, the rotor being in the stop position, the slide being in the in position.

In the nonlimiting exemplary embodiment illustrated in FIGS. 1 to 6, the device comprises mainly a casing 1, a rotor 2, a key 3, a tilting lever 4, a spring 5, a slide 6, a tilting finger 7 and a cam 8.

The casing 1 comprises a visible front face 11 for insertion of the key 3, and a rear face 12. This casing 1 comprises an inner housing 13, a bearing surface 14, and an axial housing 15 housing a slide 6.

The rotor 2 is mounted so as to rotate in the casing 1. It comprises an opening on the side of the front face 11 of the casing 1 allowing the insertion of the key 3. It also comprises two cylindrical drill holes 17 on the axis YY'.

The key 3 may be inserted into the rotor 2 via the front face 11 of the casing 1.

The tilting lever 4 comprises:
  a u-shaped member 41 comprising an orifice 42 allowing the key 3 to pass. The inner surface 45 of the orifice 42 interacts with the key 3 in order to be placed in a top position when the key 3 is in the rotor 2 and to be placed in a bottom position when the key 3 is withdrawn from the rotor 2,
  a lever finger 43 comprising a contact face 46 in this instance inclined to 105 degrees relative to the axis LL' of the tilting lever 4 and situated on the side opposite to the u-shaped member 41 relative to the axis YY' of the tilting lever 4,
  a body 42 of slender shape connecting the u-shaped member 41 to the lever finger 43,
  two nipples 44 placed substantially in the center of the lever 4 and forming a pivot about the axis YY.

The spring 5 works in compression. It rests at one of its ends on the bearing surface 14 of the casing 1.

The slide 6 comprises, at one end, a portion 61 making it possible to connect it to a device for locking the steering column of a vehicle, and, at the other end, two successive orifices, namely a rear orifice 62 of rectangular shape and a front orifice 63 of rectangular shape.

The tilting finger 7 comprises a one-piece body having on one side two successive protruberances engaging respectively through the two orifices 62,63,
  the protuberance 72 of substantially parallelepipedal shape forms a locking member which interacts with the lever finger 43,
  the protuberance 73 is used to provide the pivoting link between the body of the tilting finger 7 and the slide 6. Having a substantially parallelepipedal shape, it comprises a concavity 74 in which an edge of the orifice of the slide engages so as to form a hinge about which the tilting finger 7 can tilt.
  a bearing surface 71 for a spring 5 is placed on the tilting finger 7.

The cam 8 has a body 81 of generally cylindrical shape coaxial with the rotor 2, comprising a cavity 120 emerging at the cylindrical face via an orifice delimited successively, from a first radial face F1 of the body 81, via an axial face F2, a radial face F3 extending a short distance from a second radial face F5 of the body 81, and a curved face F4, substantially helical, which ends at the first radial face F1 of the body 81. The bottom of the cavity 120 has, on the side of the first radial face F1 of the body 81, a cylindrical portion adjacent to the curved face F4 followed by a concavity or a clearance of substantially parallelepipedal shape. It also has a dish shape axial groove C forming a sort of ramp allowing the guidance of the tilting finger 7 from the concavity to the cylindrical radial face while following a path comprising a radial section leading the finger 7 against the curved face F4, then a curved section along the curved face F4, in order to finally reach the cylindrical portion, before returning, level with the concavity, to the first radial face F1 before then returning opposite the concavity.

Figure 2:
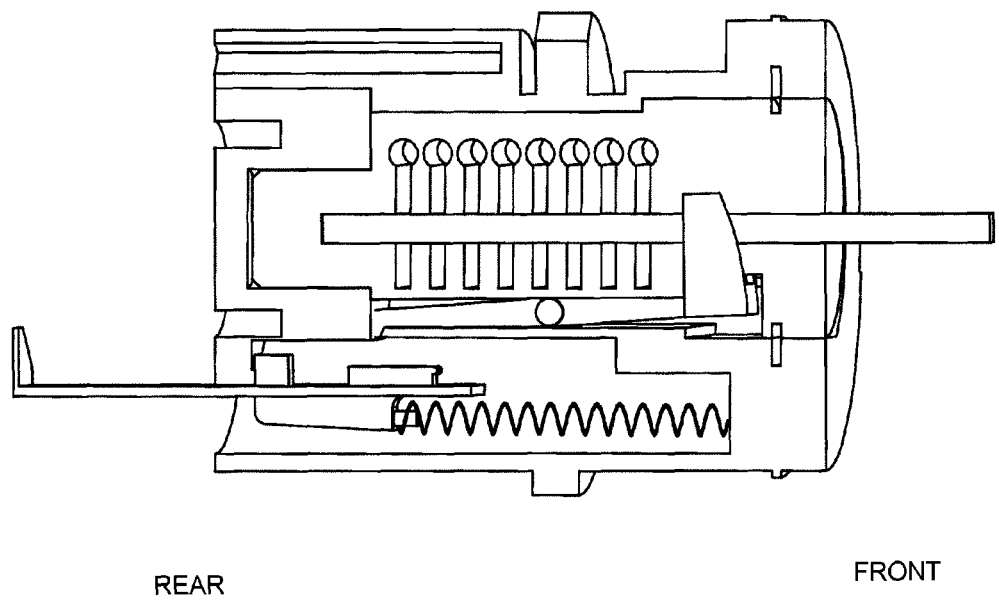
FIG. 2 shows schematically a section of a rotor according to the invention, the key being withdrawn from the rotor, the rotor being in the stop position, the slide being in the out position.
Figure 3:
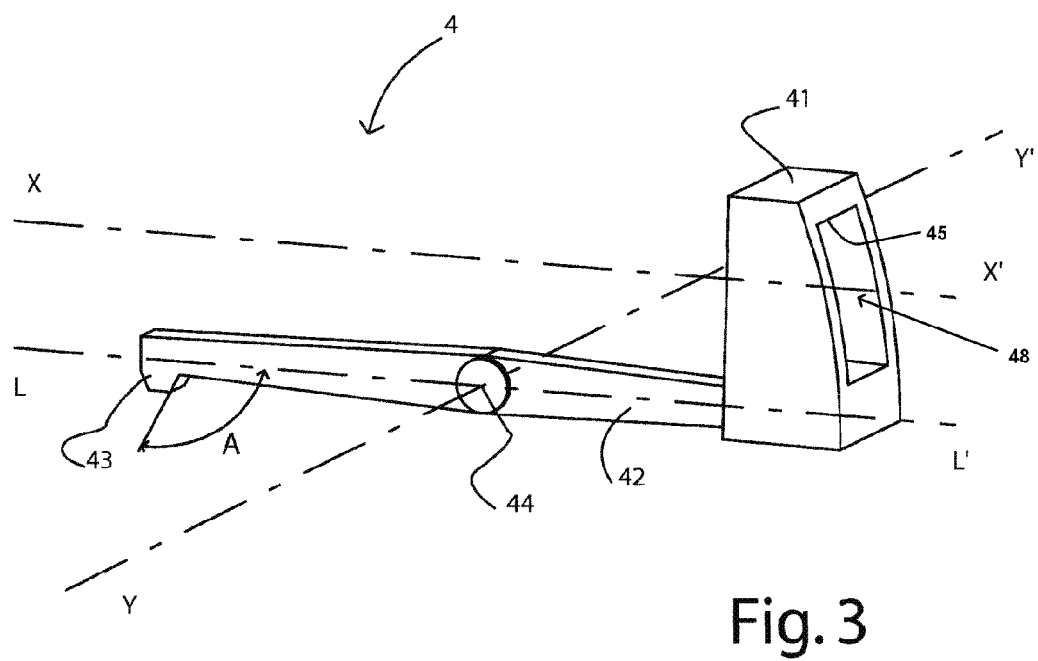
FIG. 3 shows schematically a view in perspective of a tilting lever according to the invention.
Figure 4:
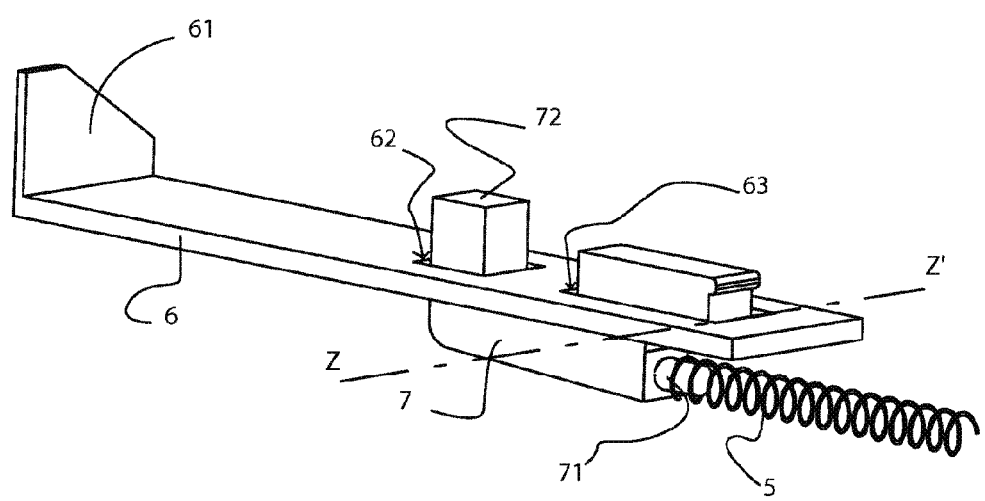
FIG. 4 shows schematically a view in perspective of a slide furnished with a tilting finger.
Figure 5:
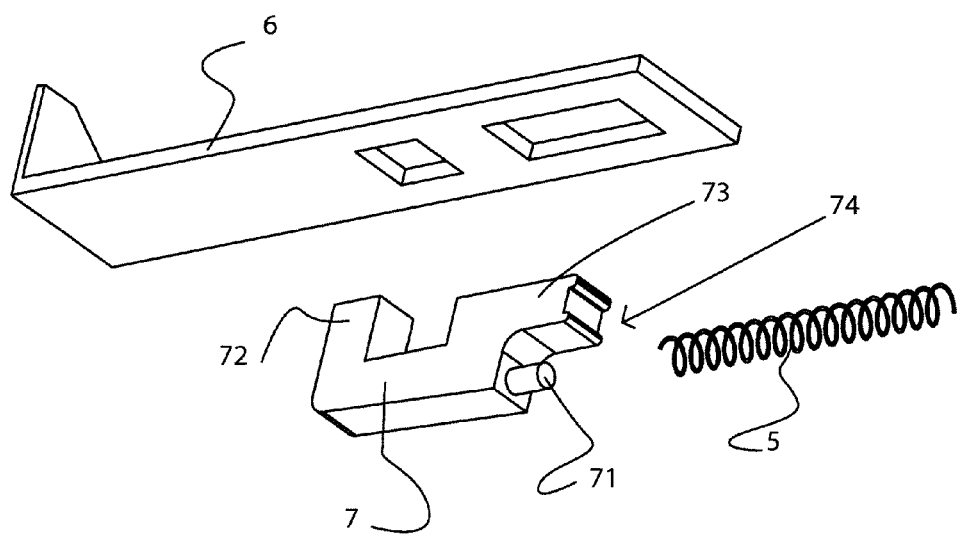
FIG. 5 shows schematically an exploded view of the slide, of the tilting finger and of the spring.

The operation of such a device is as follows:
  In the rest position before use, the key 3 is withdrawn from the rotor 2 (FIG. 2). In this case, the u-shaped member 41 of the lever 4 is in the bottom position and the lever finger 43 is slotted into the cam 8 so that the lever finger 43 practically blocks off the whole of the cavity 120 provided for this purpose in the cam 8. The spring 5 pushes on the tilting finger 7 which, in turn, pushes the slide 6 outward.
  Inserting the key 3 into the u-shaped member 41 of the tilting lever 4 applies force to the upper internal surface 45 of the u-shaped member 41. This causes the tilting lever 4 to turn about its rotation point and consequently lowers the level finger 43.
  When the key 3 turns, the tilting finger 7 follows the cam (curved face F4). The slide 6 then moves toward the front of the rotor 2 until the tilting finger 7 reaches the first radial face of the cam 8 (surface F1). The slide 6 is then in the in position.
  Returning to the rest position, the tilting finger 7 follows the first radial face (surface F1) of the cam 8 which is a flat surface perpendicular to the axis XX'. During this movement, the tilting finger 7 and the slide 6 do not move. The slide 6 remains in the in position. On arriving close to the stop position, the tilting finger 7 no longer presses on the first radial face F1 of the cam but on the t contact face 46 of the lever finger 43 which prevents the tilting finger 7 from entering the axial groove (C) of the cam 8.
  When the key 3 is withdrawn, the spring 5 pushes the tilting finger 7 which tends to apply an axial pressure on the lever finger 43 and, given the respective slopes, tends to turn the lever 4 in order to raise the lever finger 43 in a cavity of the rotor provided for this purpose and thereby free the path so that the tilting finger 7 and the slide 6 pushed by the spring 5 can move rearward.

Figure 6:
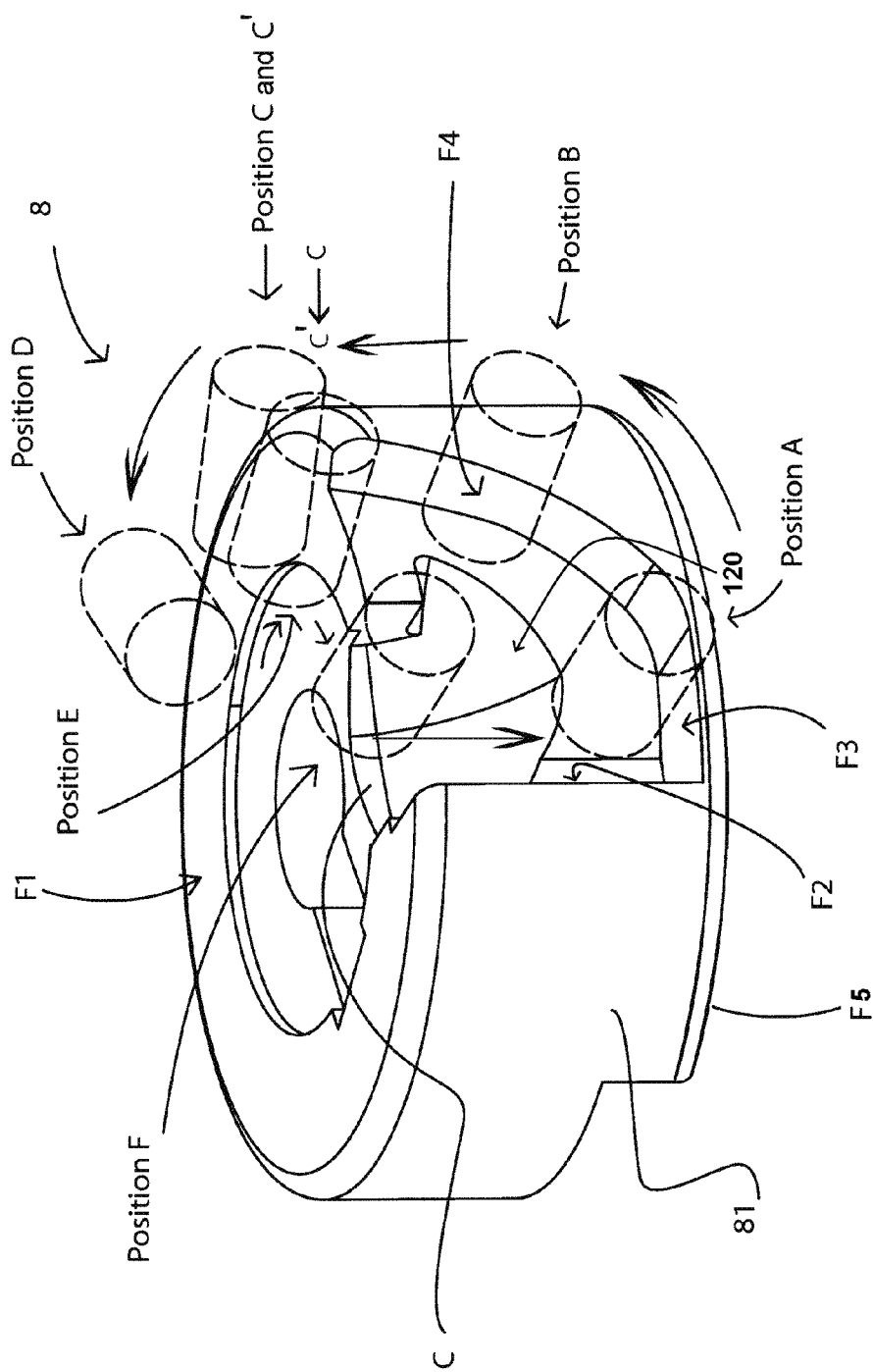
FIG. 6 shows schematically a view in perspective of cam mounted at the end of the rotor.

FIG. 6 shows in greater detail the relative positions of the tilting finger 7 relative to the cam 8. The tilting finger 7 passes successively from position A to position B then position C and C' then position D and subsequently returns running along the surface F1 to position A if its path is not obstructed by the lever finger 43.

It can therefore be seen that it is possible to carry out all the operations using only one spring and having precise movements of the various moveable elements. The slide is therefore subjected to balanced forces which make it less subject to inappropriate jamming. The low friction forces make it possible to use cheaper plastics.

Those skilled in the art can apply this concept to many other similar systems without departing from the context of the invention defined in the attached claims.

The invention claimed is:

1. An antitheft device for motor vehicle steering comprising:
  a casing in which a rotor is mounted so as to rotate between an angular rest position and at least one angular position of use, in which a key cannot be extracted from the rotor, wherein when in the angular rest position the key may be inserted axially via an orifice, from a visible front face to a rear face, or withdrawn axially;

the rotor comprising, at the opposite end from said orifice, a cam placed on the rear face of the rotor, wherein the cam is configured to interact with a surface of a control finger, wherein the control finger engages through an orifice in a slide, wherein the slide is mounted so as to slide in an axial direction in the casing between an out antitheft position and an in position retracted inside the casing, wherein when in the out antitheft position, the slide is pushed elastically by a compression spring and in which the slide protrudes axially rearward through an opening of the casing in order to control the rotational locking of a member of the steering column when the rotor is in the rest position, with the key extracted; and a locking device comprising:

an elongated tilting lever;

a u-shaped sensor disposed at one end of the elongated tilting lever situated in the vicinity of the entrance of the rotor, the sensor configured to be operated by the key when the key is inserted into an orifice of the u-shaped sensor, a retractable lever finger disposed at another end of the elongated tilting lever, wherein the lever finger can move between a locked position and an unlocked position, wherein in the locked position a contact face of the lever finger contacts the surface of the control finger in order to prevent the longitudinal movement of the slide in the direction toward the cam, wherein, when the rotor is in the at least one angular position of use and the key is engaged therein, the lever finger is in the locked position and the axial movement of the slide in the direction of the cam against the compression spring is prevented, and wherein, when the rotor is in the rest position and the key is withdrawn from the rotor, the lever finger is in the unlocked position and the slide is free to move under the effect of the compression spring.

2. The antitheft device as claimed in claim 1, wherein the locking device comprises:

a central fixed axis YY' relative to the rotor, perpendicular to an axis XX' of the rotor, the tilting lever being free to turn about the axis YY'.

3. The antitheft device as claimed in claim 2, wherein the contact face of the lever finger interacting with the control finger is oriented at an angle of between 100 and 145 degrees relative to the longitudinal axis LL' of the tilting lever, so that the lever finger escapes under the action of the control finger subjected to the pressure of the spring, when the key is withdrawn from the rotor.

4. The antitheft device as claimed in claim 2, wherein the contact face of the lever finger interacting with the control finger is in the plane of an inner face of the cam so that the control finger can without difficulty pass from a position wherein the control finger is pressing on the inner face of the cam to a position wherein the control finger is pressing on the contact face of the lever finger, when the rotor and the key are turned and the rotor reaches the stop position.

* * * * *